United States Patent
Shikama (10) Patent No.: US 12,507,995 B2
(45) Date of Patent: Dec. 30, 2025

(54) ULTRASOUND DIAGNOSTIC APPARATUS, ULTRASOUND IMAGE DISPLAY METHOD, AND RECORDING MEDIUM

(71) Applicant: Konica Minolta, Inc., Tokyo (JP)

(72) Inventor: Jo Shikama, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 18/777,184

(22) Filed: Jul. 18, 2024

(65) Prior Publication Data

US 2025/0032092 A1 Jan. 30, 2025

(30) Foreign Application Priority Data

Jul. 28, 2023 (JP) .................................. 2023-122934

(51) Int. Cl.
    *A61B 8/00* (2006.01)
    *A61B 8/08* (2006.01)

(52) U.S. Cl.
    CPC .............. *A61B 8/463* (2013.01); *A61B 8/085* (2013.01)

(58) Field of Classification Search
    CPC ........ A61B 8/463; A61B 8/085; A61B 8/4405; A61B 8/467; A61B 8/5207; A61B 8/5223; A61B 8/54
    See application file for complete search history.

(56) References Cited

U.S. PATENT DOCUMENTS

| | | | |
|---|---|---|---|
| 2014/0221835 A1* | 8/2014 | Ota .................... | A61B 8/463 600/443 |
| 2019/0099160 A1* | 4/2019 | Choi ................... | G01S 15/8911 |
| 2021/0077061 A1* | 3/2021 | Pinkovich ............ | G16H 30/40 |

FOREIGN PATENT DOCUMENTS

| | | |
|---|---|---|
| JP | 2021-058232 A | 4/2021 |
| JP | 2022-172565 A | 11/2022 |

* cited by examiner

*Primary Examiner* — Kaitlyn E Sebastian
(74) *Attorney, Agent, or Firm* — LUCAS & MERCANTI, LLP

(57) ABSTRACT

An ultrasound diagnostic apparatus includes a first hardware processor that detects a nerve region from a first ultrasound image to generate a second ultrasound image in which the nerve region is discriminable, a first acceptor that accepts an input operation; and a second hardware processor that causes a display to display the first ultrasound image and the second ultrasound image at the same time when a single input operation is accepted by the first acceptor in a state where the second ultrasound image is not displayed.

12 Claims, 8 Drawing Sheets

ULTRASOUND DIAGNOSTIC APPARATUS, ULTRASOUND IMAGE DISPLAY METHOD, AND RECORDING MEDIUM

CROSS-REFERENCE TO RELATED APPLICATIONS

The entire disclosure of Japanese Patent Application No. 2023-122934, filed on Jul. 28, 2023, including description, claims, drawings and abstract is incorporated herein by reference.

BACKGROUND OF THE INVENTION

Technical Field

The present invention relates to an ultrasound diagnostic apparatus, an ultrasound image display method, and a recording medium.

Description of Related Art

There has been conventionally known an ultrasound diagnostic apparatus that emits ultrasound waves with an ultrasound probe to the interior of a subject, receives the reflected waves, and analyzes the reflected waves to display an ultrasound image of the interior of the subject. The subject is a living body of a patient or the like.

Also known is a technique in which an ultrasound diagnostic apparatus is used to display an ultrasound image of a subject and guide puncture of a puncture needle into a predetermined anatomical tissue (hereinafter, referred to as a tissue). Image analysis and artificial intelligence (AI) techniques are used to detect and recognize a tissue in an ultrasound image. For example, a nerve as a tissue to be punctured, a peripheral tissue structure thereof, and the like are checked before puncturing. At this time, there is known a function (nerve highlighting function) of detecting and highlighting a nerve region to assist a user such as a doctor.

Also known is a technique of discriminating and displaying a target of a subject. For example, an ultrasound diagnostic apparatus is known that calculates a likelihood distribution of a target from a brightness mode (B mode) image using a discrimination model trained through machine learning (see Japanese Patent Laid-Open No. 2021-58232).

Also known is an ultrasound image diagnostic apparatus that includes a plurality of discriminators for discriminating a discrimination target and discriminates the discrimination target in an ultrasound image by changing and using the discriminator according to an operation input by a user (see Japanese Patent Laid-Open No. 2022-172565).

Furthermore, a general ultrasound diagnostic apparatus has a function of switching between single-screen display of an ultrasound image and dual-screen display in which two ultrasound images are arranged side by side.

SUMMARY OF THE INVENTION

A procedure for puncturing the above-described nerve region will be described. In puncturing the nerve region, it is recommended that not only a nerve highlighting image but also an original ultrasound image can be referred to at the time of checking the tissue and the nerve highlighting image is not displayed at the time of puncturing.

An operation inputter of the ultrasound diagnostic apparatus includes at least a number-of-screens switching button for switching between the single-screen display and the dual-screen display, and a nerve highlighting button for turning on/off the nerve highlighting image display. First, in a state of the single-screen live display of the B-mode image, a user presses the number-of-screens switching button to switch to the dual-screen live display of the B-mode image. The user presses the nerve highlighting button to switch to dual-screen live display of the B-mode image and the nerve highlighting image to observe the tissue at the puncture destination.

The user presses the nerve highlighting button again to return to the dual-screen live display of the B-mode image. The user presses the number-of-screens switching button again to return to the single-screen live display of the B-mode image and start the puncture. Therefore, it is necessary to press the buttons four times to start the puncture, which requires time and effort for the operation.

An object of the present invention is to reduce the time required for the workflow of puncturing a nerve region while reducing the number of user's operations.

To achieve at least one of the abovementioned objects, according to an aspect of the present invention, an ultrasound diagnostic apparatus reflecting one aspect of the present invention includes:

a first hardware processor that detects a nerve region from a first ultrasound image and generates a second ultrasound image in which the nerve region is discriminable;

a first acceptor that accepts an input operation; and a second hardware processor that causes a display to display the first ultrasound image and the second ultrasound image at the same time when a single input operation is accepted by the first acceptor in a state where the second ultrasound image is not displayed.

To achieve at least one of the abovementioned objects, according to an aspect of the present invention, an ultrasound image display method reflecting one aspect of the present invention includes:

causing a first hardware processor to detect a nerve region from a first ultrasound image to generate a second ultrasound image in which the nerve region is discriminable;

accepting an input operation; and causing a second hardware processor to display the first ultrasound image and the second ultrasound image at the same time when a single input operation is accepted in a state where the second ultrasound image is not displayed.

To achieve at least one of the abovementioned objects, according to an aspect of the present invention, a non-transitory computer readable recording medium reflecting one aspect of the present invention stores a program that causes a computer to perform:

detecting a nerve region from a first ultrasound image to generate a second ultrasound image in which the nerve region is discriminable; and causing a display to display the first ultrasound image and the second ultrasound image at the same time when a single input operation is accepted in a state where the second ultrasound image is not displayed.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein.

DETAILED DESCRIPTION

Hereinafter, one or more embodiments of the present invention will be described with reference to the drawings. However, the scope of the invention is not limited to the disclosed embodiments.

First Embodiment

Figure 1:
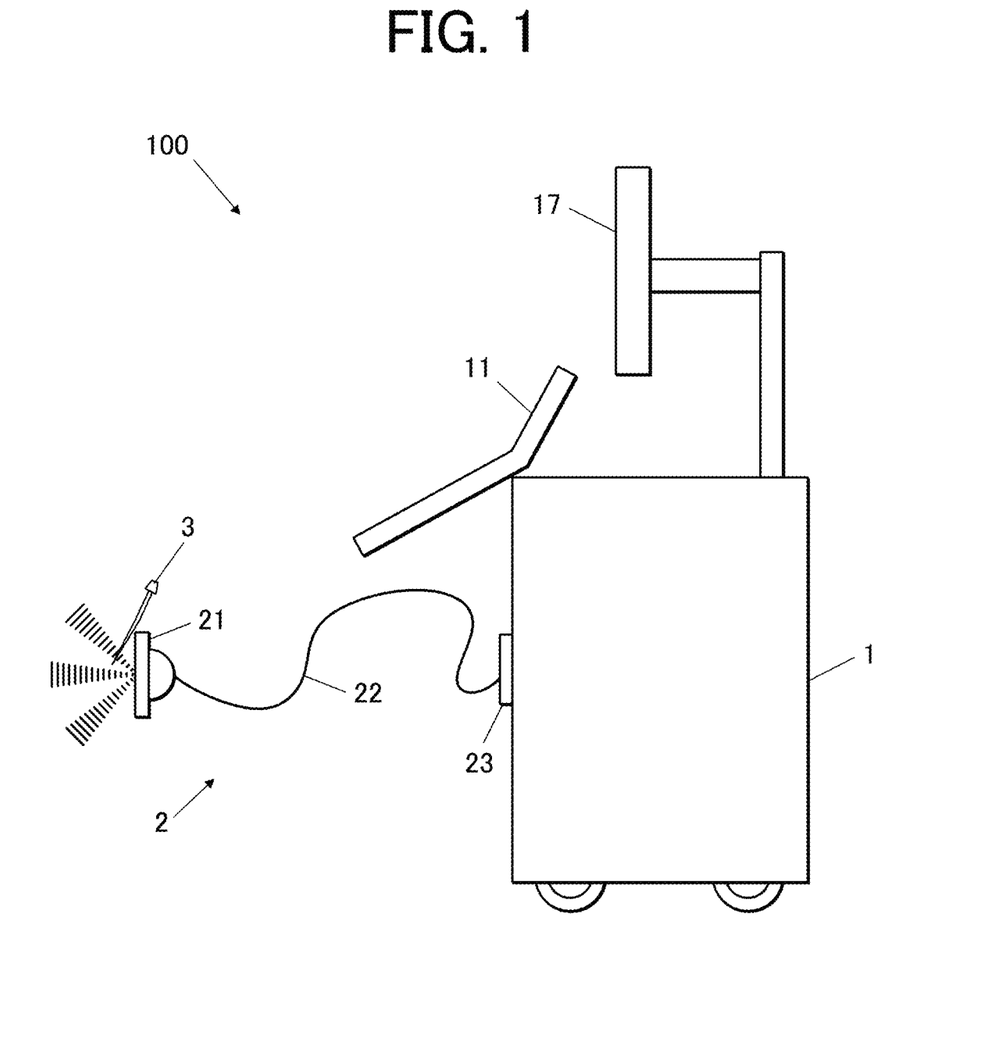
FIG. 1 is a schematic diagram of an ultrasound diagnostic apparatus according to a first embodiment of the present invention.
Figure 2:
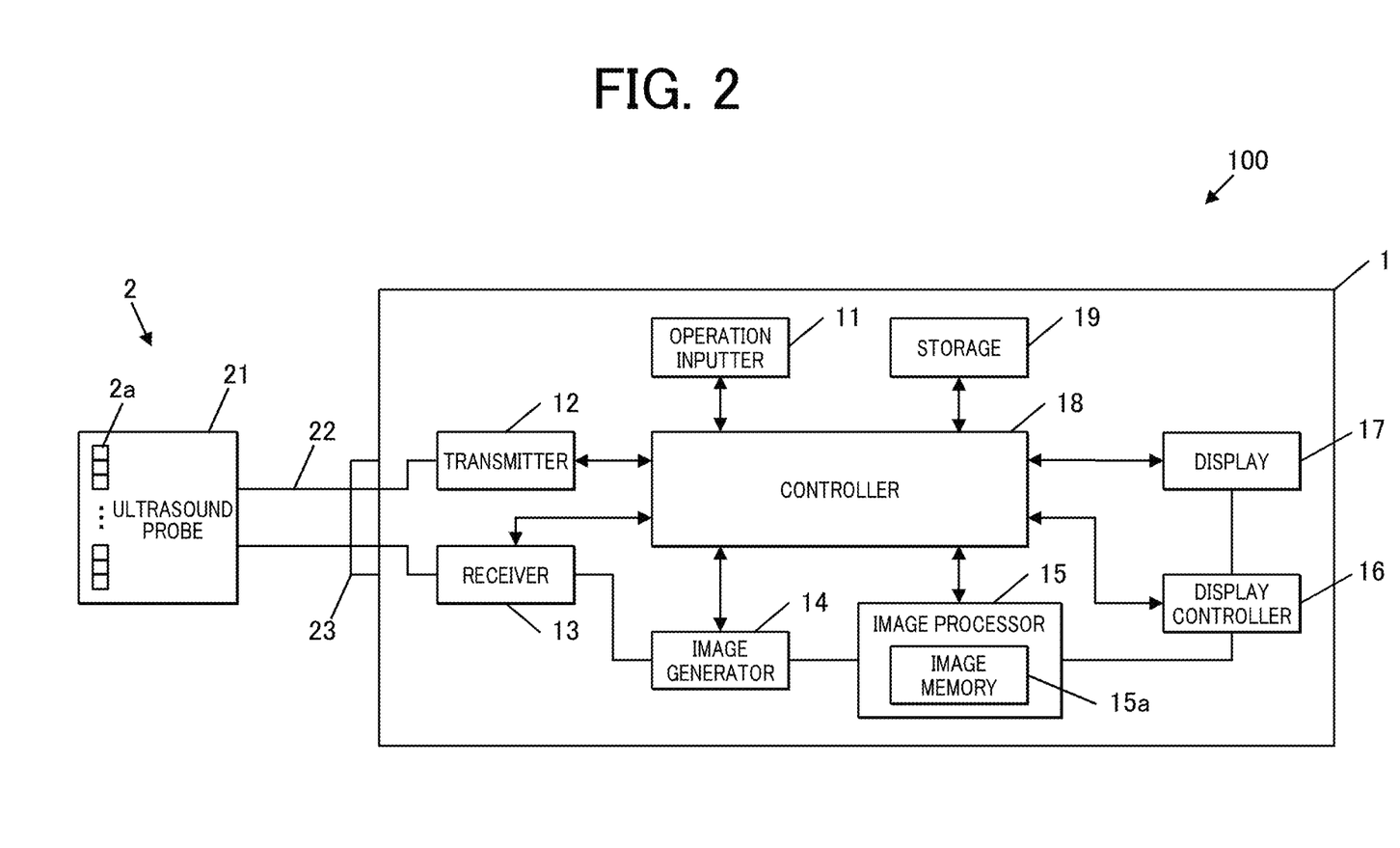
FIG. 2 is a block diagram illustrating a functional configuration of the ultrasound diagnostic apparatus.

A first embodiment of the present invention will be described with reference to FIGS. 1 to 4. First, a configuration of an apparatus according to the present embodiment will be described with reference to FIGS. 1 and 2. FIG. 1 is a schematic diagram of an ultrasound diagnostic apparatus 100 of the present embodiment. FIG. 2 is a block diagram illustrating a functional configuration of the ultrasound diagnostic apparatus 100.

The ultrasound diagnostic apparatus 100 is provided in a medical facility such as a hospital. As illustrated in FIG. 1, the ultrasound diagnostic apparatus 100 includes an ultrasound diagnostic apparatus main body 1, an ultrasound probe 2, and a puncture needle 3. The ultrasound diagnostic apparatus main body 1 includes an operation inputter 11 and a display 17. The ultrasound probe 2 is connected to the ultrasound diagnostic apparatus main body 1. The ultrasound probe 2 transmits ultrasound waves (transmission ultrasound waves) to the inside of a subject and receives reflected waves (reflected ultrasound waves: echoes) of the ultrasound waves reflected in the subject. The subject is a living body of a patient (not illustrated) or the like. The ultrasound probe 2 has an ultrasound probe main body 21, a cable 22, and a connector 23. The ultrasound probe main body 21 is a header of the ultrasound probe 2 and transmits and receives ultrasound waves. The cable 22 is connected to the ultrasound probe main body 21 and the connector 23. The cable 22 is a cable through which a driving signal for the ultrasound probe main body 21 and a reception signal of ultrasound waves flow. The connector 23 is a plug connector for establishing a connection with a receptacle connector (not illustrated) of the ultrasound diagnostic apparatus main body 1.

The ultrasound diagnostic apparatus main body 1 is connected to the ultrasound probe main body 21 via the connector 23 and the cable 22. The ultrasound diagnostic apparatus main body 1 transmits a driving signal, which is an electric signal, to the ultrasound probe main body 21 to direct the ultrasound probe main body 21 to transmit transmission ultrasound waves to the subject. The ultrasound probe 2 generates a reception signal, which is an electric signal, according to the reflected ultrasound waves from the inside of the subject received by the ultrasound probe main body 21. The ultrasound diagnostic apparatus main body 1 images the internal state of the subject as ultrasound image data on the basis of the reception signal generated by the ultrasound probe 2.

The ultrasound probe main body 21 has transducers 2a (FIG. 2) at a distal end side. For example, a plurality of transducers 2a are arranged in a one-dimensional array in an azimuth direction (scanning direction). Alternatively, the transducers 2a may be arranged in a two-dimensional array. Furthermore, the number of transducers 2a can be set to any value. In the present embodiment, a linear scanning type electronic scanning probe is adopted as the ultrasound probe 2. However, the ultrasound probe 2 may be of either an electronic scanning type or a mechanical scanning type. In addition, the ultrasound probe 2 may be of any of a linear scanning type, a sector scanning type, and a convex scanning type. The ultrasound diagnostic apparatus main body 1 and the ultrasound probe 2 may be configured to perform wireless communication between each other instead of wired communication via the cable 22. This wireless communication is Ultra Wide Band (UWB) or the like.

The puncture needle 3 is a treatment instrument that has a hollow long needle shape and is inserted (punctured) into a subject such as a patient at an angle determined freehand by a user such as a doctor or a technician. The puncture needle 3 can be converted into a puncture needle having an appropriate thickness, length, and distal end shape depending on a site to be collected of the subject or the type or amount of a medical agent or the like to be injected. In the present embodiment, the site (tissue) to be collected or medicated by the puncture needle 3 is a nerve as a target or its peripheral tissue. The puncture needle 3 may be configured to be attached to the ultrasound probe 2 by an adapter. The user inserts the puncture needle 3 into the subject while observing an ultrasound image displayed by the ultrasound diagnostic apparatus 100.

As illustrated in FIG. 2, the ultrasound diagnostic apparatus main body 1 includes the operation inputter 11, a transmitter 12, a receiver 13, an image generator 14, an image processor 15 (i.e., a first hardware processor), a display controller 16, a display 17, a controller 18 (i.e., a second hardware processor), and a storage 19. The operation inputter 11 functions as a first acceptor, a second acceptor, and a third acceptor. The image processor 15 functions as an image generator. The display 17 and the controller 18 function as a display. The controller 18 functions as a setter.

For example, the operation inputter 11 accepts the input of a command giving an instruction to start diagnosis or data such as personal information of the subject from the user such as a doctor or a technician. The operation inputter 11 includes operation elements for performing this input, such as various switches, buttons, a trackball, a mouse, a keyboard, a touch pad, and a multifunction switch. The operation inputter 11 accepts an operation input from the user via each operation element and outputs an operation signal to the controller 18.

Figure 5:
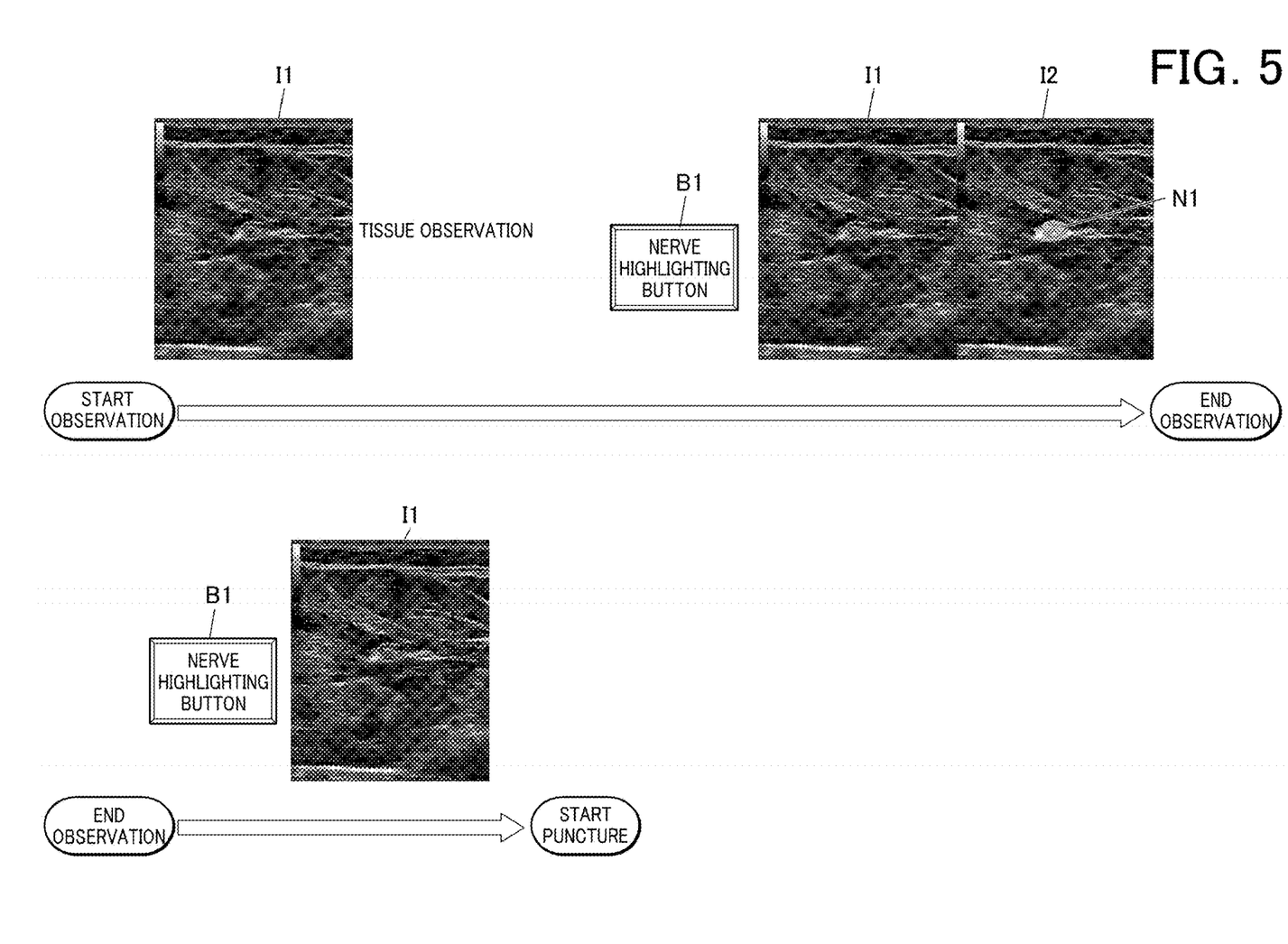
FIG. 5 is a diagram illustrating display images and an operation button in the first image display processing.
Figure 6:
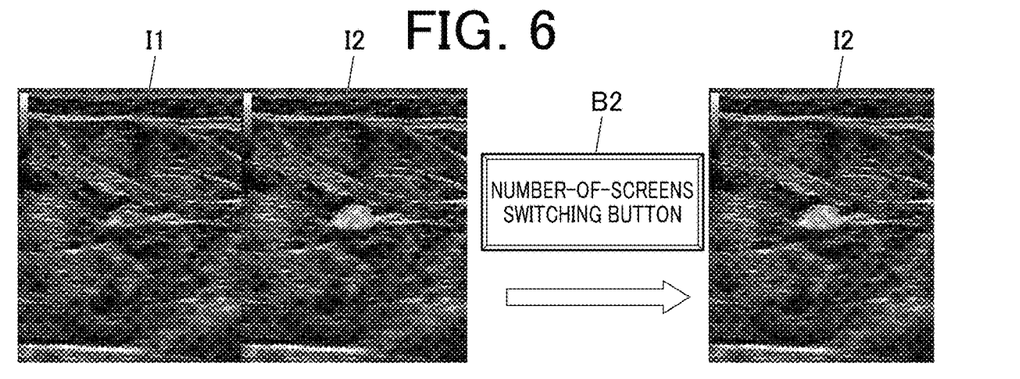
FIG. 6 is a diagram illustrating display images at the time of switching the number of screens.

In particular, the operation inputter 11 includes a nerve highlighting button B1 (FIG. 5) and a number-of-screens switching button B2 (FIG. 6). The nerve highlighting button B1 is a button that accepts a press input for activation on/off of a neural highlighting function, which will be described later. The number-of-screens switching button B2 is a button that accepts a press input for switching from dual-screen display to single-screen display of an ultrasound image, which will be described later.

Note that the operation inputter 11 may be configured to include a touch screen that accepts a touch input from the user and outputs the touch operation information to the controller 18. In this case, hard keys such as the nerves highlighting button B1 and the number-of-screens switching button B2 may be replaced with soft keys to be displayed on the display 17.

Under the control of the controller 18, the transmitter 12 supplies a driving signal, which is an electric signal, to the ultrasound probe 2 to direct the ultrasound probe 2 to generate transmission ultrasound waves. The transmitter 12 includes, for example, a clock generation circuit, a delay circuit, and a pulse generation circuit. The clock generation circuit generates a clock signal for determining the transmission timing and transmission frequency of the driving signal. The delay circuit sets a delay time for each individual path corresponding to each transducer 2a and delays the transmission of the driving signal by the set delay time. The delay circuit focuses transmission beams formed by the transmission ultrasound waves by the delay. The pulse generating circuit generates a pulse signal as a driving signal at a predetermined cycle. The transmitter 12 drives, for example, some successive transducers 2a (e.g., 64 successive transducers) among the plurality of (e.g., 192) transducers 2a which are arranged in the ultrasound prove 2 to generate the transmission ultrasound waves. Then, the transmitter 12 performs scanning by shifting the transducer 2a to be driven in the azimuth direction (scanning direction) whenever the transmission ultrasound waves are generated.

The receiver 13 receives a reception signal, which is an electric signal, from the ultrasound probe 2 under the control of the controller 18. The receiver 13 includes, for example, an amplifier, an analog-to-digital (A/D) conversion circuit, and a phasing addition circuit. The amplifier amplifies the reception signal with a preset amplification factor for each individual path corresponding to each transducer 2a. The A/D conversion circuit performs analog-to-digital conversion (A/D conversion) on the amplified reception signal. The phasing addition circuit provides a delay time to the A/D converted reception signal for each individual path corresponding to each transducer 2a to adjust the time phase, and adds (performs phasing addition on) the reception signals to generate sound ray data.

Under the control of the controller 18, the image generator 14 performs envelope detection processing, logarithmic compression, or the like on the sound ray data from the receiver 13 and adjusts a dynamic range and gain to convert brightness. Through the brightness conversion, the image generator 14 generates B-mode image data including pixels having brightness values as received energy. That is, the B-mode image data represents the intensity of a reception signal by brightness. Note that the image generator 14 may be configured to be able to generate image data in an image mode other than the B mode, such as the color Doppler mode.

The image processor 15 includes an image memory 15a. The image memory 15a includes, for example, a semiconductor memory such as a dynamic random access memory (DRAM). The image processor 15 stores the B-mode image data transmitted from the image generator 14 in the image memory 15a in units of frames under the control of the controller 18. The B-mode image data in units of frames may be referred to as ultrasound image data. The image processor 15 transmits the ultrasound image data stored in the image memory 15a to the display controller 16 frame by frame at predetermined time intervals under the control of the controller 18.

In addition, the image processor 15 has a nerve highlighting function of discriminating, coloring, and highlighting a nerve region of the subject as a nerve region for target discrimination in the B-mode image of the B-mode image data. With the nerve highlighting function, the image processor 15 generates, from the B-mode image data, nerve highlighting image data in which a nerve region is highlighted. The highlighted color of the nerve region is, for example, yellow as a color other than black and white of the B-mode image. However, it is not limited to yellow.

The nerve highlighting function includes a method using machine learning. For example, machine learning using teacher data having a nerve region is performed in advance on a discriminator that discriminates the nerve region from the B-mode image data. The discriminator is, for example, a convolutional neural network (CNN). The teacher data includes ultrasound image data and correct answer data obtained by labeling a nerve region portion in the ultrasound image with 1. The image processor 15 discriminates the nerve region from the B-mode image data using the trained discriminator, and colors the discriminated nerve region to generate the nerve highlighting image data. The learned discriminator is stored in the storage 19.

The method using machine learning of a nerve highlighting function is not limited to the above-described method. For example, as disclosed in Japanese Patent Laid-Open No. 2021-58232, a method may be adopted in which a discriminator that calculates a likelihood indicating the likelihood of a target (nerve) from B-mode image data is used. The image processor 15 generates a likelihood distribution of nerves from the B-mode image data using the trained discriminator, and adds color information (hue, saturation, and lightness) to the B-mode image data according to the likelihood distribution. The image processor 15 generates nerve highlighting image data in which nerves having a high likelihood are highlighted with color information.

Furthermore, the nerve highlighting function may use another method, such as image analysis, other than the method using machine learning. For example, the image processor 15 may be configured to extract feature points of the nerve region from the B-mode image data, discriminate the nerve region using the extracted feature points, and generate the nerve highlighting image data.

Under the control of the controller 18, the display controller 16 performs processing such as coordinate conversion on the B-mode image data and the nerve highlighting image data input from the image processor 15, to convert the data into image signals for display. The display controller 16 outputs the image signals to the display 17.

The display 17 includes a display device such as a liquid crystal display (LCD), an electronic luminescence (organic EL) display, an inorganic EL display, or a plasma display. The display 17 displays display information input from the controller 18 under the control of the controller 18. Furthermore, under the control of the controller 18, the display 17 displays an ultrasound image or the like on a display screen according to a display signal of image data input from the display controller 16.

The controller 18 includes, for example, a central processing unit (CPU), a read only memory (ROM), and a random access memory (RAM). The controller 18 reads various processing programs stored in the ROM, develops them in the RAM, and controls the units of the ultrasound diagnostic apparatus 100 by cooperation between the developed programs and the CPU. The ROM includes a nonvolatile memory such as a semiconductor. The ROM stores a system program corresponding to the ultrasound diagnostic apparatus 100, various processing programs executable on the system program, various data such as a gamma table, and the like. In particular, the ROM stores a first image display program for executing first image display processing, which will be described later. These programs are stored in the RAM in the form of computer-readable program codes. The CPU sequentially executes operations according to the program codes on the RAM. The RAM forms a work area in which various programs executed by the CPU and data related to these programs are temporarily stored.

The storage 19 is a storage such as a hard disk drive (HDD) or a solid state drive (SSD) that stores information such as ultrasound image data in a writable and readable manner. In particular, the storage 19 stores a trained discriminator of the above-described nerve highlighting function and preset data.

The preset data is setting data of a plurality of various parameter sets such as the size and lightness of an ultrasound image. The user can freely name the preset data using the clinical department, the observation site, the body shape of the patient, and the like. The user can select and specify preset data to be used from a plurality of pieces of preset data before a medical examination (inspection) of a patient. In particular, each piece of preset data includes screen setting information indicating whether to perform single-screen display or dual-screen display by default at the time of activation of the nerve highlighting function in the first image display processing. The single-screen display is a method of displaying a B-mode image as a single screen. The dual-screen display is a display method in which a B-mode image and a nerve highlighting image are arranged as two screens so as to be in contact with each other in the right-left direction. Alternatively, the dual-screen display may be the display in which the B-mode image and the nerve highlighting image are arranged as two screens so as to be in contact with each other in the up-down direction.

Figure 3A:
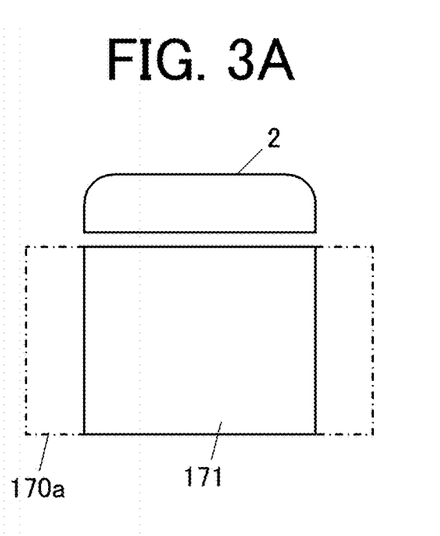
FIG. 3A is a diagram illustrating a displayable region in single-screen display.
Figure 3B:
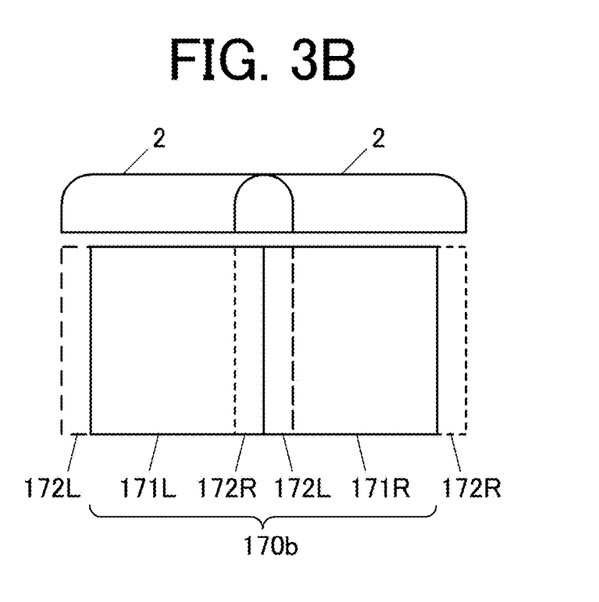
FIG. 3B is a diagram illustrating a displayable region in dual-screen display.

Here, with reference to FIGS. 3A and 3B, a displayable region of ultrasound image(s) in the single-screen display and the dual-screen display will be described. FIG. 3A is a diagram illustrating a displayable region 170a in the single-screen display. FIG. 3B is a diagram illustrating a displayable region 170b in the dual-screen display.

As illustrated in FIG. 3A, in the single-screen display of a B-mode image using the ultrasound probe 2, the displayable region 170a of the B-mode image can be displayed on the display 17. The displayable region 170a includes at least an ultrasound image 171 desired to be displayed.

As illustrated in FIG. 3B, in the dual-screen display of the B-mode image using the ultrasound probe 2, a displayable region 170b of the two ultrasound images can be displayed on the display 17. In FIG. 3B, since the displayable region 170b is used as a reference, the ultrasound probes 2 are also illustrated so as to be arranged side by side in the right-left direction. However, the two ultrasound probes 2 in the drawing are actually located at the same position. The displayable region 170b provides the dual-screen display in which a left image 171L indicated by a solid line and a right image 171R indicated by a solid line are arranged side by side in the right-left direction. The displayable region 170a and the displayable region 170b have the same size.

The B-mode image generated by the ultrasound probe 2 on the left side includes, in addition to the left image 171L, cut-off portions 172L indicated by dotted lines at the left and right ends. The B-mode image generated by the ultrasound probe 2 on the right side includes, in addition to the right image 171R, cut-off portions 172R indicated by dotted lines at the left and right ends. Since the cut-off portions 172L and 172R are not included in the displayable region 170b, they are not displayed. As described above, in the case of the dual-screen display, the ultrasound image data obtained from the ultrasound probes 2 cannot be entirely displayed, and therefore may be cut off on the display 17. At the time of the dual-screen display in which the nerve highlighting function is enabled, the number-of-screens switching button B2 may be pressed to display only the nerve highlighting image, not the B-mode image of the original image. This makes it possible to observe the entire region even if the region is cut off due to the dual-screen display during the inspection.

Furthermore, when the nerve highlighting function is enabled, whether to perform the dual-screen display or the single-screen display may be saved and applied as screen setting information in the ultrasound diagnostic apparatus 100. For example, in general, in a case where the display depth is small, there is a high possibility that both ends of the image are cut off, and therefore, whether to perform the dual-screen display or the single-screen display may be saved and applied as the screen setting information in association with the preset data of the observation site. Thus, the single-screen display is set in a case of using preset data for observing an observation site existing at a small display depth that is not cut off. In a case of using preset data for observing an observation site existing at a large depth, the dual-screen display is set. Thus, the user can observe the ultrasound image with the setting suitable for the application. To be more specific, the preset data on the observation site (such as the abdomen) corresponding to the normal display depth includes the screen setting information in which the dual-screen display is enabled. The preset data of an observation site (such as the neck) corresponding to the small depth includes screen setting information in which the single-screen display is enabled.

Note that in a case where various types of ultrasound probes 2 are associated with each piece of preset data, a configuration may be adopted in which preset data to be used is automatically selected according to the type of ultrasound probe 2 connected to the ultrasound diagnostic apparatus main body 1.

Figure 4:
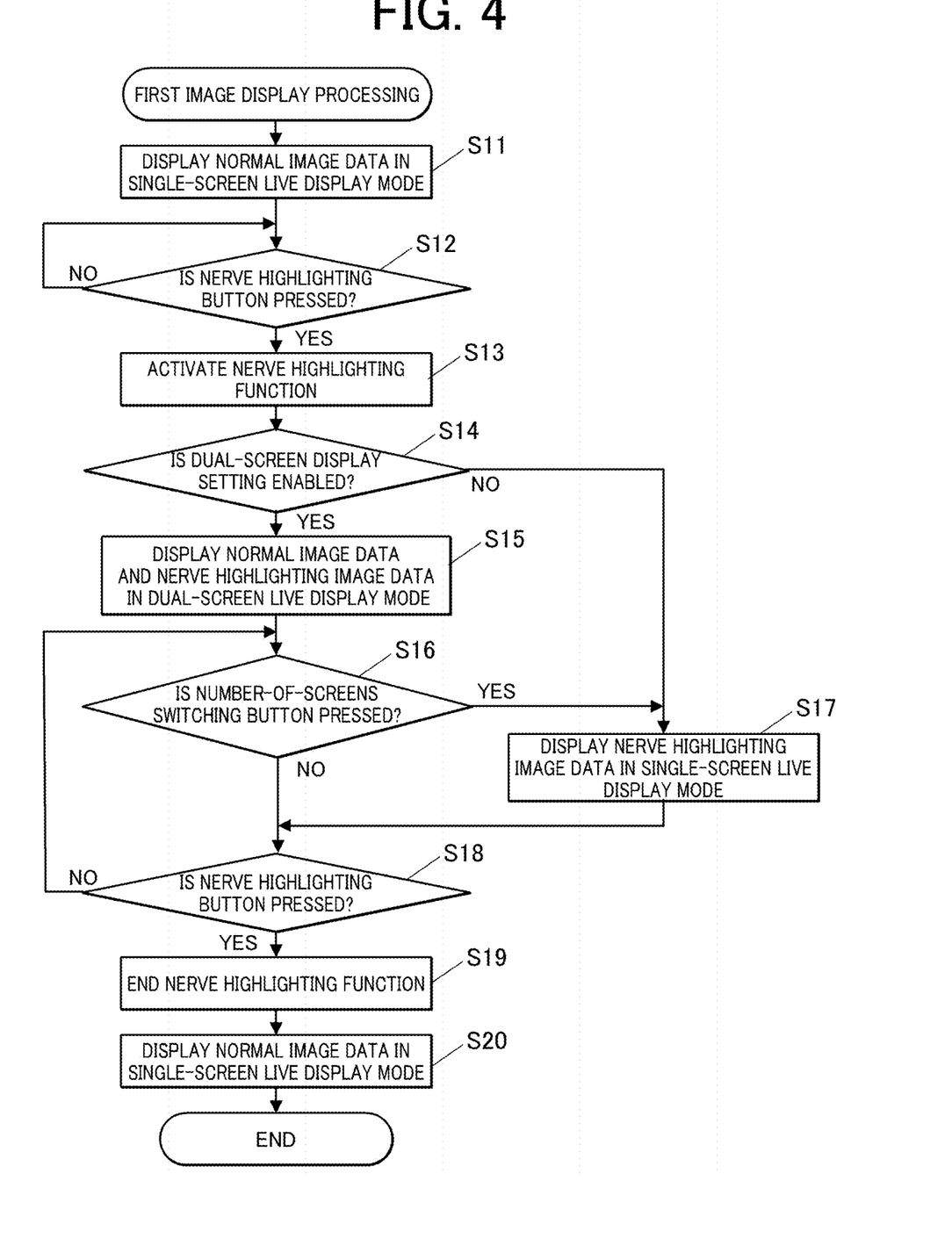
FIG. 4 is a flowchart illustrating first image display processing.

Next, the operation of the ultrasound diagnostic apparatus 100 of the present embodiment will be described with reference to FIGS. 4 to 6. FIG. 4 is a flowchart illustrating the first image display processing. FIG. 5 is a diagram illustrating display images and an operation button in the first image display processing. FIG. 6 illustrates display images at the time of switching the number of screens.

In the ultrasound diagnostic apparatus 100, it is assumed that a trained discriminator of the nerve highlighting function is stored in the storage 19 in advance. A user such as a doctor performs medical examination (inspection) on a patient who is scheduled to have a nerve as a target or its peripheral tissue punctured, using the ultrasound diagnostic apparatus 100. The user appropriately applies the ultrasound probe 2 to a subject of the patient.

In the ultrasound diagnostic apparatus 100, an instruction to execute the first image display processing and selection of preset data in the storage 19 are input from the user via the operation inputter 11. Using the instruction as a trigger, the controller 18 executes the first image display processing according to the first image display program in the ROM.

As illustrated in FIG. 4, the controller 18 controls the transmitter 12, the receiver 13, the image generator 14, the image processor 15, and the display controller 16 to start to generate normal image data (Step S11). The normal image data is normal (without nerve highlighting) B-mode image data. In Step S11, the controller 18 causes the display 17 to display the generated the normal image data in single-screen live display (both single-screen display and live display) mode. In Step S11, for example, after the start of observation in FIG. 5, a normal image I1 in which a neural region is not highlighted is displayed.

The controller 18 determines whether the nerve highlighting button B1 of the operation inputter 11 has been pressed by the user (Step S12). If the nerve highlighting button B1 is not pressed (Step S12; NO), the process proceeds to Step S12. If the neural highlighting button B1 has been pressed (Step S12; YES), the controller 18 activates the nerve highlighting function of the image processor 15 (Step S13). When the nerve highlighting function is activated, the image processor 15 starts to generate normal image data and nerve highlighting image data for highlighting the nerve region.

The controller 18 determines whether the dual-screen display is enabled with reference to the screen setting information of the selected and input preset data (Step S14). If the dual-screen display is enabled (Step S14; YES), the controller 18 causes the display 17 to display the generated normal image data and the nerve highlighting image in the dual-screen live display mode (Step S15). In Step S15, for example, after the first pressing of the nerve highlighting button B1 in FIG. 5, the normal image I1 and the nerve highlighting I2 are displayed in the dual-screen live display mode. In FIG. 5, the highlighted nerve region N1 in the nerve highlighting image I2 is illustrated as a mesh region of white lines. The normal image I1 and the nerve highlighting image I2 have the same B-mode live image in the region other than the nerve region N1.

The controller 18 determines whether the number-of-screens switching button B2 of the operation inputter 11 has been pressed by the user (Step S16). If the number-of-screens switching button B2 has been pressed (Step S16; YES), the controller 18 causes the display 17 to display the generated nerve highlighting image data in the single-screen live display mode (Step S17). In Step S17, for example, after the number-of-screens switching button B2 in FIG. 6 is pressed, the nerve highlighting image I2 is displayed in the single-screen live display mode. If the single-screen display is enabled (Step S14; NO), the process proceeds to Step S17.

The controller 18 determines whether the nerve highlighting button B1 of the operation inputter 11 has been pressed by the user (Step S18). If the number-of-screens switching button B2 is not pressed (Step S16; NO), the process proceeds to Step S18. If the nerve highlighting button B1 is not pressed (Step S18; NO), the process proceeds to Step S16. In Steps S11 to S18, the user observes a nerve as a target and its peripheral tissue.

If the nerve highlighting button B1 has been pressed (Step S18; YES), the controller 18 ends the nerve highlighting function of the image processor 15 (Step S19). Through Step S19, the generation of the nerve highlighting image data by the image processor 15 ends. The controller 18 causes the display 17 to display the generated normal image data in the single-screen live display mode (Step S20), and ends the first image display processing. In Step S20, for example, after the second pressing of the nerve highlighting button B1 in FIG. 5, the normal image I1 is displayed in the single-screen live display mode. While referring to the normal image I1 displayed in the single-screen live display mode, the user uses the puncture needle 3 to puncture the nerve as a target or its peripheral tissue.

As described above, according to the present embodiment, the ultrasound diagnostic apparatus 100 includes the image generator (the image processor 15), the first acceptor (the operation inputter 11), and the display (the display 17 and the controller 18). The image generator detects the nerve region N1 from the normal image I1 as the first ultrasound image to generate the nerve highlighting image I2 as the second ultrasound image in which the nerve region N1 is discriminable. The first acceptor accepts an input operation on the nerve highlighting button B1. In a state where the nerve highlighting image I2 is not displayed, an input operation of a single nerve highlighting button B1 is accepted by the first acceptor. In this case, the display displays the normal image I1 and the nerve highlighting image I2 at the same time.

Therefore, the normal image I1 and the nerve highlighting image I2 can be displayed at the same time by the single input operation of the nerve highlighting button B2 with fewer number of operations than before. Therefore, the number of user's operations can be reduced, and the time required for the workflow of puncturing a nerve region can be shortened. Note that the term "the same timing" at which the normal image I1 and the nerve highlighting image I2 are displayed may mean that the display start timings are different from each other, and it is sufficient that a state where the images are displayed at the same timing and a display period exist.

In a state where the normal image I1 and the nerve highlighting image I2 are displayed at the same time, a single input operation of the nerve highlighting button B1 is accepted by the first acceptor. In this case, the display displays the normal image I1 and hides the nerve highlighting image I2. Therefore, the workflow of puncturing the nerve region can be completed only by pressing the nerve highlighting button B1.

The ultrasound diagnostic apparatus 100 includes the second acceptor (the operation inputter 11). The second acceptor accepts an input operation of the number-of-screens switching button B2. The display hides the normal image I1 and displays the nerve highlighting image I2 when the second acceptor accepts the single input operation in a state where the normal image I1 and the nerve highlighting image I2 are displayed at the same time. Therefore, when all of the ultrasound images cannot be displayed in the dual-screen display mode of the normal image I1 and the nerve highlighting image I2 during the actual inspection, the display mode can be changed to display the nerve highlighting image I2 on a larger region.

The ultrasound diagnostic apparatus 100 includes the setter (the controller 18). In a state where the normal image I1 is displayed and the nerve highlighting image I2 is not displayed, a single input operation of the nerve highlighting button B1 is accepted by the first acceptor. In this case, the setter causes the display to display the normal image I1 and the nerve highlighting image I2 at the same time. Alternatively, the setter causes the display to hide the normal image I1 and display the nerve highlighting image I2. The setter can set any one of them as the screen setting information in advance. Therefore, the dual-screen display is normally performed, and in a case where each ultrasound image cannot be entirely displayed, the display mode can be changed to, for example, the single-screen display mode according to the application. The setting in which each ultrasound image cannot be entirely displayed is, for example, preset data setting for an observation site at a small depth.

Second Embodiment

Figure 7:
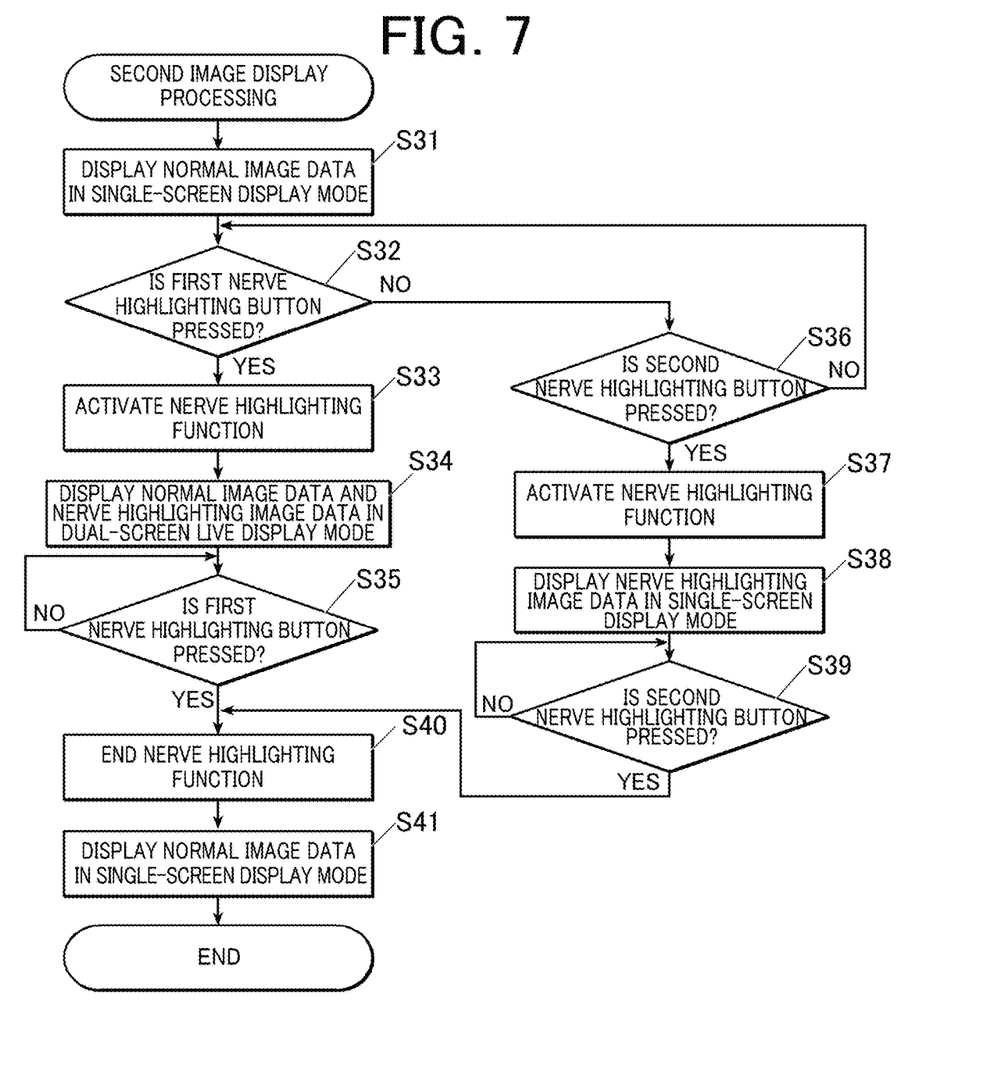
FIG. 7 is a flowchart illustrating second image display processing.

A second embodiment of the present invention will be described with reference to FIG. 7. FIG. 7 is a flowchart illustrating second image display processing.

The first embodiment described above has a configuration in which the operation inputter 11 has one type of nerve highlighting button B1. The present embodiment is a configuration in which the operation inputter 11 has two types of nerve highlighting buttons.

As an apparatus configuration of the present embodiment, similarly to the first embodiment, the ultrasound diagnostic apparatus 100 is used. Note that the operation inputter 11 includes a first nerve highlighting button and a second nerve highlighting button (both not illustrated) instead of the nerve highlighting button B1. The first nerve highlighting button is a button that accepts a press input for activation on/off of a neural highlighting function and accepts a specification input of dual-screen display of a normal image and a nerve highlighting image at the time of activation ON. The second nerve highlighting button is a button that accepts a press input for activation ON/OFF of the nerve highlighting function and accepts a specification input of single-screen display of the nerve highlighting image at the time of activation ON.

Furthermore, instead of the first image display program, a second image display program for executing the second image display processing, which will be described later, is stored in the ROM of the controller 18.

Next, the operation of the ultrasound diagnostic device 100 according to the present embodiment will be described with reference to FIG. 7. In the ultrasound diagnostic apparatus 100, it is assumed that a trained discriminator of the nerve highlighting function is stored in the storage 19 in advance.

In the ultrasound diagnostic apparatus 100, an instruction to execute the second image display processing and selection of preset data in the storage 19 are input from the user via the operation inputter 11. Using the instruction as a trigger, the controller 18 executes the second image display processing according to the second image display program in the ROM. Here, it is assumed that the preset data does not include the screen setting information.

As illustrated in FIG. 7, Step S31 is the same as Step S11 of the first image display processing in FIG. 4. The controller 18 determines whether the first nerve highlighting button of the operation inputter 11 has been pressed by the user (Step S32). If the first nerve highlighting button has been pressed (Step S32; YES), the process proceeds to Step S33. Steps S33 and S34 are the same as Steps S13 and S15 in FIG. 4. The controller 18 determines whether the first nerve highlighting button of the operation inputter 11 has been pressed by the user (Step S35). If the first nerve highlighting button is not pressed (Step S35; NO), the process proceeds to Step S35.

If the first nerve highlighting button is not pressed (Step S32; NO), the controller 18 determines whether the second nerve highlighting button has been pressed by the user (Step S36). If the second nerve highlighting button is not pressed (Step S36; NO), the process proceeds to Step S32. If the second nerve highlighting button has been pressed (Step S36; YES), the process proceeds to Step S37.

Steps S37 and S38 are the same as Steps S13 and S17 in FIG. 4. The controller 18 determines whether the second nerve highlighting button of the operation inputter 11 has been pressed by the user (Step S39). If the second nerve highlighting button is not pressed (Step S39; NO), the process proceeds to Step S39.

If the first nerve highlighting button has been pressed (Step S35; YES), or if the second nerve highlighting button has been pressed (Step S39; YES), the process proceeds to Step S40. Steps S40 and S41 are the same as Steps S19 and S20 in FIG. 4.

As described above, according to the present embodiment, the ultrasound diagnostic apparatus 100 includes the third acceptor (the operation inputter 11). The third acceptor accepts input operations of the first nerve highlighting button and the second nerve highlighting button. In a state where the normal image I1 is displayed and the nerve highlighting image I2 is not displayed, the input operation of the second nerve highlighting button is accepted by the third acceptor. In this case, the display (the display 17 and the controller 18) switches the normal image I1 to the nerve highlighting image I2 and displays the nerve highlighting image I2. Therefore, enabling the second nerve highlighting button (or the first nerve highlighting button) to be pressed makes it possible for the user to select a display mode according to the situation.

Third Embodiment

Figure 8:
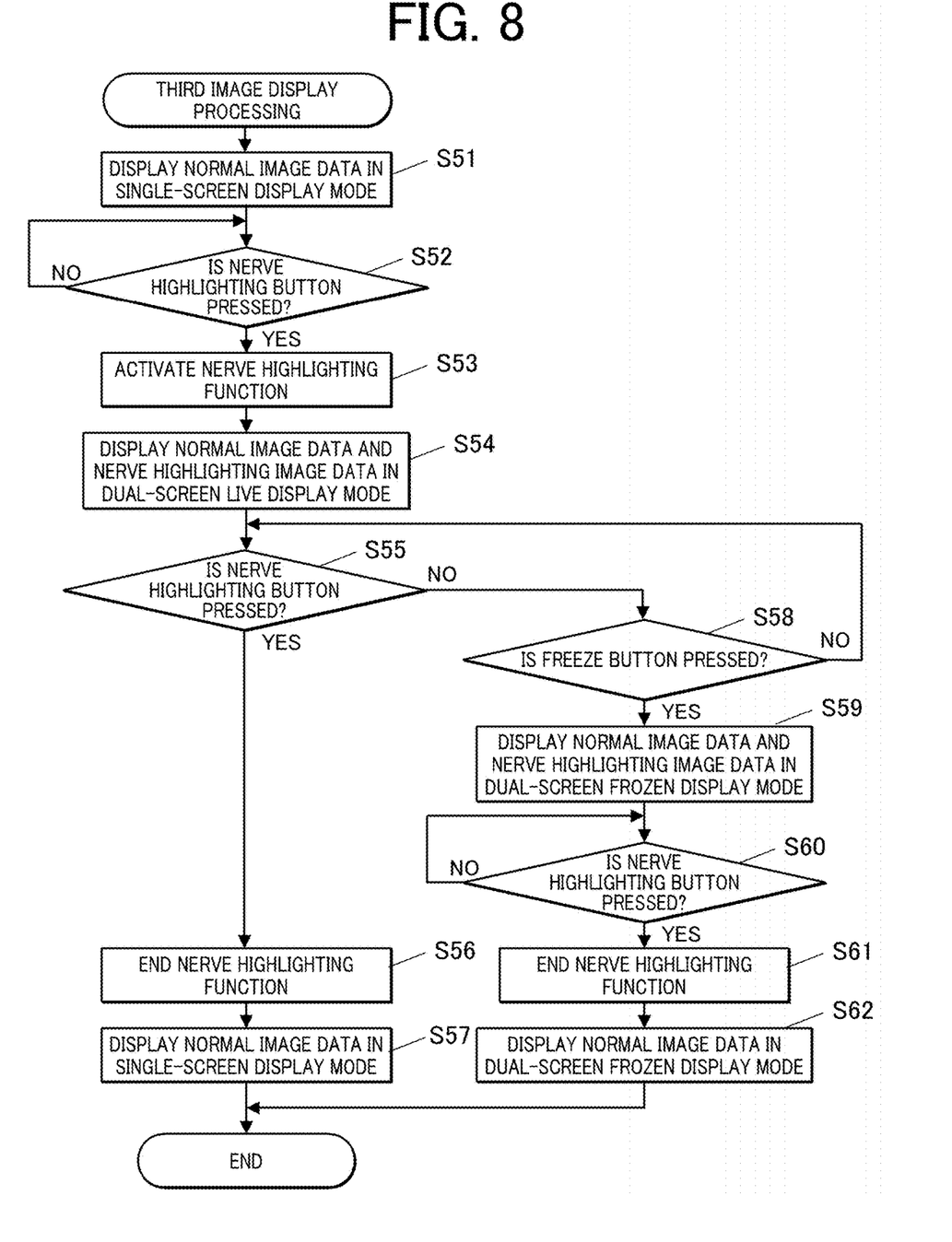
FIG. 8 is a flowchart illustrating third image display processing.
Figure 9:
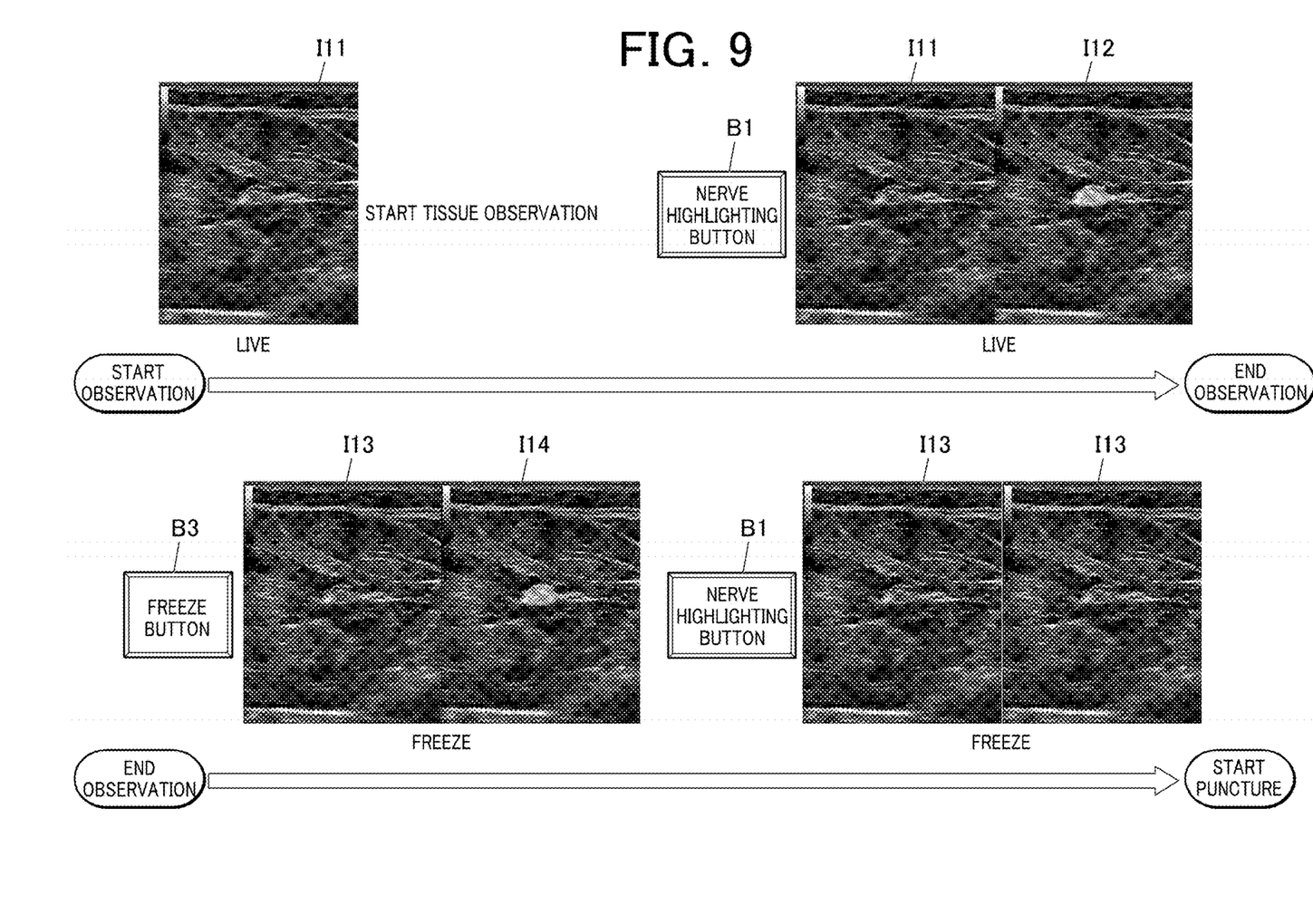
FIG. 9 is a diagram illustrating a display image and operation buttons in the first image display processing.

A third embodiment of the present invention will be described with reference to FIGS. 8 and 9. FIG. 8 is a flowchart illustrating third image display processing. FIG. 9 is a diagram illustrating display images and operation buttons in the third image display processing.

The first embodiment described above is configured to display the normal image data and the nerve highlighting image data in a live display mode during the puncture with the puncture needle 3. In the present embodiment, the normal image data and the nerve highlighting image data are displayed in the live display mode, and the normal image data and the nerve highlighting image data are displayed in a frozen display mode at the time of a freeze operation.

As an apparatus configuration of the present embodiment, similarly to the first embodiment, the ultrasound diagnostic apparatus 100 is used. Note that the operation inputter 11 includes a freeze button B3 (FIG. 9) in addition to the nerve highlighting button B1. The freeze button B3 is a button that accepts a press input of a freeze instruction during live display of an ultrasound image. Furthermore, instead of the first image display program, a third image display program for executing the third image display processing, which will be described later, is stored in the ROM of the controller 18.

Next, the operation of the ultrasound diagnostic device 100 according to the present embodiment will be described with reference to FIGS. 8 and 9. In the ultrasound diagnostic apparatus 100, it is assumed that a trained discriminator of the nerve highlighting function is stored in the storage 19 in advance.

In the ultrasound diagnostic apparatus 100, an instruction to execute the third image display processing and selection of preset data in the storage 19 are input from the user via the operation inputter 11. Using the instruction as a trigger, the controller 18 executes the third image display processing according to the third image display program in the ROM. Here, it is assumed that the preset data does not include the screen setting information.

As illustrated in FIG. 8, Step S51 is the same as Step S11 of the first image display processing in FIG. 4. In Step S51, for example, a normal image I11 is displayed after the start of the observation in FIG. 9.

Steps S52, S53, and S54 are the same as Steps S12, S13, and S15 of the first image display processing in FIG. 4. In Step S54, for example, after the first pressing of the nerve highlighting button B1 in FIG. 9, the normal image I11 and a nerve highlighting I12 are displayed in the dual-screen live display mode.

Steps S55, S56, and S57 are the same as Steps S18, S19, and S20 in the first image display processing in FIG. 4. If the nerves highlighting button B1 has not been pressed (Step S55; NO), the controller 18 determines whether the freeze button B3 of the operation inputter 11 has been pressed by the user (Step S58). If the freeze button B3 is not pressed (Step S58; NO), the process proceeds to Step S55.

If the freeze button B3 has been pressed (Step S58; YES), the controller 18 causes the display 17 to display the generated normal image and the nerve highlighting image in the dual-screen frozen display mode (Step S15). In Step S15, for example, after the freeze button B3 in FIG. 5 is pressed, a normal image I13 and a nerve highlighting image I14 are displayed in the dual-screen frozen display mode. The dual-screen freeze display is dual-screen display of two frozen ultrasound images which are displayed at the same time and are still images. The normal image I13 is a normal image based on the normal image data of the still image at the time of pressing the freeze button B3. The nerve highlighting image I14 is a nerve highlighting image based on the nerve highlighting image data of the still image at the time of pressing the freeze button B3.

Steps S60 and S61 are the same as Steps S18 and S19 in FIG. 4. If the nerves highlighting button B1 is not pressed (Step S60; NO), the process proceeds to Step S60.

The controller 18 performs dual-screen freeze display of the normal images being displayed in Step S59 (Step S62), and ends the third image display processing. In Step S62, for example, after the second pressing of the neural highlighting button B1 in FIG. 9, the normal images I13 are displayed in a single-screen freeze display mode. While referring to the normal images I13 displayed in the dual-screen freeze display mode, the user uses the puncture needle 3 to puncture a nerve region as a target or its peripheral tissue. Furthermore, the display positions of the normal image I13 and the nerve highlighting image I14 after the freeze button B3 is pressed are the same as the display positions of the two right and left normal images I13 after the first pressing of the nerve highlighting button I13.

As described above, according to the present embodiment, the first ultrasound image (the normal image I13) and the second ultrasound image (the nerve highlighting image I14) are displayed in the dual-screen freeze display state. In this state, an input operation of the neural highlighting button B1 is accepted by the first acceptor. In this case, the display (the display 17 and the controller 18) switches the displayed nerve highlighting image I14 to the normal image I13 while maintaining the display of the displayed normal image I13. The display displays two normal images I13 in the dual-screen freeze display mode. Therefore, the display of the nerve highlighting image I14 can be canceled while maintaining the dual-screen freeze display. Therefore, since the line of sight between the nerve highlighting image I14 and the normal image I13 does not change, it is easy to confirm the nerve region as the target and its peripheral tissue.

The display switches the displayed nerve highlighting image I14 to the normal image I13 at the same display position. Therefore, since the line of sight between the nerve highlighting image I14 and the normal image I13 does not change at all, the nerve region as the target and its peripheral tissue can be more easily confirmed.

Note that a configuration may be adopted in which, in a state where the normal image I13 whose display is maintained and the normal image I13 that is displayed after switching are displayed, an input operation of the nerves highlighting button B1 is accepted. In this case, the display switches the normal image I13 that is displayed after switching, to the nerve highlighting image I14 while maintaining the display of the normal image I13 whose display is maintained. Therefore, while the line of sight between the nerve highlighting image I14 and the normal image I13t is kept unchanged, the images are switched a plurality of times, so that the nerve region as the target and its peripheral tissue can be more easily confirmed.

In the above description, an example in which the ROM of the controller 18 is used as a computer-readable medium of the program according to the present invention is disclosed, but the present invention is not limited to this example. As other computer-readable media, a nonvolatile memory such as a flash memory and a portable recording medium such as a CD-ROM can be applied. Furthermore, as a medium for providing data of the program according to the present invention via a communication line, a carrier wave is also applied to the present invention.

Note that the description in the above embodiments is an example of the ultrasound diagnostic apparatus, the ultrasound image display method, and the program according to the present invention, and the present invention is not limited to this. For example, at least two of the above-described embodiments may be appropriately combined.

Furthermore, although the above-described first and second embodiments are examples of live display of ultrasound image data, the present invention is not limited to these. The configurations of the first and second embodiments may be applied to display of ultrasound image data of a still image.

In addition, the detailed configuration and the detailed operation of the ultrasound diagnostic apparatus 100 in the embodiments described above can also be appropriately modified without departing from the spirit and scope of the present invention.

Although embodiments of the present invention have been described and illustrated in detail, the disclosed embodiments are made for purposes of illustration and example only and not limitation. The scope of the present invention should be interpreted by terms of the appended claims.

The entire disclosure of Japanese Patent Application No. 2023-122934 filed on Jul. 28, 2023 is incorporated herein by reference in its entirety.

What is claimed is:

1. An ultrasound diagnostic apparatus, comprising:
    a first hardware processor that performs a nerve highlighting function that detects a nerve region from a first ultrasound image to generate a second ultrasound image in which the nerve region is discriminable;
    a first acceptor that accepts an input operation; and
    a second hardware processor that causes a display to display the first ultrasound image and the second ultrasound image at the same time,
    wherein the nerve highlighting function by the first hardware processor and the display of the first ultrasound image and the second ultrasound image at the same time by the second hardware processor are both performed in response to when a single input operation is accepted by the first acceptor in a state where the second ultrasound image is not displayed.

2. The ultrasound diagnostic apparatus according to claim 1, wherein the second hardware processor causes the display to display the first ultrasound image and hide the second ultrasound image when the single input operation is accepted by the first acceptor in a state where the first ultrasound image and the second ultrasound image are displayed at the same time.

3. The ultrasound diagnostic apparatus according to claim 1, further comprising:
a second acceptor that accepts an input operation, wherein the second hardware processor causes the display to hide the first ultrasound image and display the second ultrasound image when a single input operation is accepted by the second acceptor in a state where the first ultrasound image and the second ultrasound image are displayed at the same time.

4. The ultrasound diagnostic apparatus according to claim 1, wherein the second hardware processor
determines whether screen setting information indicates that dual-screen display is enabled, and
causes the display to display the first ultrasound image and the second ultrasound image at the same time when the single input operation is accepted by the first acceptor and the dual-screen display is enabled in a state where the first ultrasound image is displayed and the second ultrasound image is not displayed.

5. The ultrasound diagnostic apparatus according to claim 1, further comprising:
a third acceptor that accepts an input operation, wherein the second hardware processor switches the first ultrasound image to the second ultrasound image to cause the display to display the second ultrasound image when the input operation is accepted by the third acceptor in a state where the first ultrasound image is displayed and the second ultrasound image is not displayed.

6. The ultrasound diagnostic apparatus according to claim 1, wherein, in a state where the second hardware processor causes the display to display an ultrasound image in a frozen state,
the second hardware processor switches the second ultrasound image being displayed to the first ultrasound image to cause the display to display the first ultrasound image while display of the first ultrasound image being displayed is maintained when an input operation is accepted by the first acceptor in a state where the first ultrasound image and the second ultrasound image are displayed.

7. The ultrasound diagnostic apparatus according to claim 6, wherein the second hardware processor switches the second ultrasound image being displayed to the first ultrasound image at the same display position to cause the display to display the first ultrasound image.

8. The ultrasound diagnostic apparatus according to claim 6, wherein the second hardware processor switches the first ultrasound image displayed after the switching to the second ultrasound image while display of the first ultrasound image whose display is maintained continues to be maintained when an input operation is accepted by the first acceptor in a state where the first ultrasound image whose display is maintained and the first ultrasound image displayed after the switching are displayed on the display.

9. The ultrasound diagnostic apparatus according to claim 1, wherein
the second hardware processor causes the display to display the first ultrasound image and not display the second ultrasound image in a single-screen live display mode and causes the display to display the first ultrasound image and the second ultrasound image at the same time in a dual-screen live display mode,
wherein, in response to when the single input operation is accepted by the first acceptor in the single-screen live display mode, the first hardware processor activates the nerve highlighting function and the second hardware processor switches to the dual-screen live display mode.

10. The ultrasound diagnostic apparatus according to claim 1, wherein
when the single input operation is accepted by the first acceptor in a state where the second ultrasound image is not displayed:
the first hardware processor activates the nerve highlighting function;
the second hardware processor determines whether screen setting information indicates dual-screen display is enabled, causes the display to display the first ultrasound image and the second ultrasound image at the same time when dual-screen display is enabled, and causes the display to display the second ultrasound image and not display the first ultrasound image when the dual-screen display is not enabled.

11. An ultrasound image display method causing a first hardware processor to perform:
a nerve highlighting function by detecting a nerve region from a first ultrasound image to generate a second ultrasound image in which the nerve region is discriminable; and
accepting an input operation, and
causing a second hardware processor to perform: causing a display to display the first ultrasound image and the second ultrasound image at the same time,
wherein the nerve highlighting function by the first hardware processor and the display of the first ultrasound image and the second ultrasound image at the same time the second hardware processor are both performed in response to when a single input operation is accepted in a state where the second ultrasound image is not displayed.

12. A non-transitory computer readable reading medium storing a program causing a computer to perform:
performing a nerve highlighting function by detecting a nerve region from a first ultrasound image to generate a second ultrasound image in which the nerve region is discriminable; and
causing a display to display the first ultrasound image and the second ultrasound image at the same time,
wherein the nerve highlighting function and the display of the first ultrasound image and the second ultrasound image at the same time are both performed in response to when a single input operation is accepted in a state where the second ultrasound image is not displayed.

* * * * *